United States Patent
Arauz-Rosado et al.

(10) Patent No.: US 9,237,088 B2
(45) Date of Patent: *Jan. 12, 2016

(54) IMS CALL ROUTING USING TEL-URIS

(71) Applicant: TELEFONAKTIEBOLAGET L M ERICSSON (PUBL), Stockholm (SE)

(72) Inventors: Jesus-Javier Arauz-Rosado, Madrid (ES); Fredrik Airiksson, Sundbyberg (SE)

(73) Assignee: TELEFONAKTIEBOLAGET L M ERICSSON (PUBL), Stockholm (SE)

( * ) Notice: Subject to any disclaimer, the term of this patent is extended or adjusted under 35 U.S.C. 154(b) by 204 days.

This patent is subject to a terminal disclaimer.

(21) Appl. No.: 13/739,555

(22) Filed: Jan. 11, 2013

(65) Prior Publication Data
US 2013/0114592 A1 May 9, 2013

Related U.S. Application Data

(63) Continuation of application No. 12/090,988, filed as application No. PCT/IB2006/002957 on Oct. 20, 2006, now Pat. No. 8,619,794.

(60) Provisional application No. 60/729,012, filed on Oct. 21, 2005.

(51) Int. Cl.
*H04L 12/701* (2013.01)
*H04L 29/12* (2006.01)
*H04L 29/06* (2006.01)

(52) U.S. Cl.
CPC ............ *H04L 45/00* (2013.01); *H04L 29/1216* (2013.01); *H04L 29/12584* (2013.01); *H04L 29/12896* (2013.01); *H04L 61/157* (2013.01); *H04L 61/2596* (2013.01); *H04L 61/605* (2013.01); *H04L 65/1016* (2013.01)

(58) Field of Classification Search
None
See application file for complete search history.

(56) References Cited

U.S. PATENT DOCUMENTS

| | | | | |
|---|---|---|---|---|
| 2003/0012170 | A1* | 1/2003 | Vassilovski et al. | 370/342 |
| 2006/0050686 | A1* | 3/2006 | Velez-Rivera et al. | 370/352 |
| 2006/0209794 | A1* | 9/2006 | Bae et al. | 370/352 |

FOREIGN PATENT DOCUMENTS

| | | |
|---|---|---|
| WO | WO 2004/071043 A1 | 8/2004 |
| WO | WO 2006/020997 A2 | 2/2006 |

OTHER PUBLICATIONS

3GPP Digital Cellular Telecommunications Systems (Phase 2+); Universal Mobile Telecommunication Systems (UMTS);IP Multimedia Subsystems (IMS): Stage 2 (3GPP TS 23.228 v6.11.0 Release 6). ETSI Standards TS 123 228 v6.11.0. Sep. 2005.

Yu: "New Parameters for the "tel" URL to Support Number Portability and Freephone Service". IETF Working Draft. <draft-yu-tel-url-08.txt>. Nov. 2003.

(Continued)

*Primary Examiner* — Anez Ebrahim

(57) ABSTRACT

The present invention proposes a specific handling of tel URIs in an IMS terminating network so as to enable routing of calls using telephone numbers (and not SIP URIs with embedded telephone numbers) as identifiers of the target users of those calls. Specifically, the present invention introduces a conversion module which is located within the IMS terminating network and is capable of converting SIP URIs with embedded telephone numbers into equivalent tel URIs which are then used by a terminating I-CSCF and S-CSCF to query the SLF and/or HSS so that they can route the calls to the target users.

18 Claims, 7 Drawing Sheets

(56) References Cited

OTHER PUBLICATIONS

Vaha-Sipila; "URLs for Telephone Calls". Network Working Group. RFC 2806. Apr. 2000.

Rosenberg, "SIP: Session Initiation Protocol", Network Working Group. RFC 3261. Jun. 2002.

3GPP. 3$^{rd}$ Generation Partnership Project; Technical Specification Group Core Network and Terminals; Signalling Flows for the IP Muitimedia Call Control Based on Session Initiation Protocol (SIP); and Session Description Protocol (SOP); StaQe 3 (Release 5). 3GPP TS 24.228 v5.13.0. Jun. 2005.

3GPP 3$^{rd}$ Generation Partnership Project; Technical Specification Group Core Network and Terminals; IP Multimedia Call Control Based on Session Initiation Protocol (SIP); and Session Description Protocol (SOP); Stage 3 (Release 7). 3GPP TS 24.229 v7 .1.0. Sep. 2005.

Schulzrinne: "The tel URI for Telephone Numbers". Network Working Group. RFC 3966. Dec. 2004.

* cited by examiner

IMS CALL ROUTING USING TEL-URIS

CLAIMING BENEFIT OF PRIOR FILED U.S. APPLICATION

This application is a continuation application of U.S. patent application Ser. No. 12/090,988, filed Apr. 21, 2008, now U.S. Pat. No. 8,619,794, which is a 371 of PCT/IB06/02957 filed on Oct. 20, 2006, which claims the benefit of U.S. Provisional Application Ser. No. 60/729,012 filed on Oct. 21, 2005. The contents of these documents are hereby incorporated by reference herein.

TECHNICAL FIELD

The present invention relates in general to an IMS terminating network which enables the renting of calls to target users by using telephone numbers tel URIs (and not SIP URIs with embedded telephone numbers) as identifiers of the particular target users.

BACKGROUND

The following abbreviations are herewith defined, at least some of which are referred to within the ensuing description of the prior art and the present invention.
3GPP Third Generation Partnership Project
AS Application Server
CSCF Call Session Control Function
DNS Domain Name System
HSS Home Subscriber Server
IAM Initial Address Message
IBCF Interworking Border Control Function
I-CSCF Interrogating CSCF
IMS IP Multimedia Subsystem
IP Internet Protocol
MGCF Media Gateway Control Function
MMS Multimedia Messaging Service
POTS Plain Old Telephone Service
PSTN Public Switched Telephone Network
PUI Public User Identity
RFC Request For Comments
RTP Real-Time Transport Protocol
S-CSCF Serving CSCF
SIP Session Initiation Protocol
SLF Subscription Locator Function
TCP Transmission Control Protocol
UA User Agent
UE User Equipment
URI Uniform Resource Identifier
UTM URI Translation Module An IMS network is an IP-based network that enables User Agents (UAs) of an IMS network, as well as User Equipments (UEs) of other legacy networks, to establish multi-media sessions to other UAs so they can exchange any kind of real-time information (e.g. voice, video) or non-real-time information (e.g. messages, pictures). In its current state, the IMS network uses a SIP protocol to establish the multi-media sessions and a transport protocol like e.g. RTP to carry the payload of the multi-media sessions.

In the IMS network, the information is routed on a multi-media session that was established with the target user by using an UPI that identifies that user and by using a set of well-defined routing rules that must be followed by ail of the elements within the IMS network. This set of rules is defined for 3GPP-compliant IMS networks in 3GPP TS 24.229 V.5.14.0 (October 2005) which is entitled "IP Multimedia Call Control Protocol Based on Session Initiation Protocol (SIP) and Session Description Protocol (SOP)" (the contents of which are incorporated by reference herein).

There are two types of URIs that can be used to identify a particular target user when establishing a multi-media, session: (1) SIP URIs; and (2) tel URIs. A SIP URI has a format that is defined in RFC3261 which is entitled "SIP: Session Initiation Protocol" June 2002 (the contents of which are incorporated by reference herein). Examples of SIP URIs are:
sip:peter@yahoo.com
sip:James.Rowling@RowlingAndAssociates.co.uk
sip:voice_mail@vodafone.com;reason=no_answer
While, the format of a tel URI is defined in RFC3966 which is entitled "The tel URI for Telephone Numbers" (the contents of which are incorporated by reference herein). Examples of tel URIs are:
tel:+1-234-567-89
tel:2997;phone-context=+3491339
In addition, there is a way to express a SIP URI with an embedded tel URI which is discussed in RFC3261. For instance, the exemplary tel-URIs could be embedded within SIP URIs as follows:
sip:+1-234-567-89@cingular.com;user=phone
sip:2997;phone-context-=+3491339@vodafone.com; user=phone:

A section of the set of routing rules mentioned above is devoted to routing calls between two different, network operators. Specifically, when routing a call between two network operators a SIP URI or SIP URI/embedded tel URI must be used to identify the target user for the call. FIG. 1 (PRIOR ART) is a signal flow diagram used to help describe a first routing process, namely the inter-operator process of using a SIP URI/embedded tel URI to route a call from a $UA_1$ located in an originating network 102 to a $UA_2$ located in a terminating/destination network 104. The steps are as follows (reference is made to 3GPP TS 24.229 for more details):

1-3. The originating $S\text{-}CSCF_1$ receives a SIP request, (e.g., INVITE tel: +123) from $UA_1$ (step 1). The $S\text{-}CSCF_1$ takes a Request-URI from the received session-initiating INVITE request and if the Request-URI contains a tel URI then $S\text{-}CSCF_1$ queries an $ENUM_1$ service (step 2). The $ENUM_1$ changes the tel URI into a SIP URI/embedded tel URI (e.g., sip: +123@op.com;user=phone) and sends it to the $S\text{-}CSCF_1$ (step 3). The $S\text{-}CSCF_1$ replaces the original Request-URI in the SIP request with the SIP URI/embedded tel URI obtained from the query to form a new SIP request, (e.g., INVITE sip: +123@op.com; user=phone).

4. The originating $S\text{-}CSCF_1$ takes the domain part (e.g., op.com) of the new Request-URI and forwards the new INVITE SIP request to the address identified by that domain (if the domain is an IPv4 or IPv6 address the INVITE can be forwarded to that address straight, away, otherwise a DNS needs to be queried using the domain part to obtain a destination IP address, which corresponds to either an IBCF or an $I\text{-}CSCF_2$ in the terminating network 104). In this example, the $S\text{-}CSCF_1$ forwards the new SIP request (e.g., INVITE sip: +123@op.com;user=phone) directly to the $I\text{-}CSCF_2$ (step 4).

5-6. The $I\text{-}CSCF_2$ is the first CSCF contacted for the terminating call and has the role of locating the $S\text{-}CSCF_2$ that is serving the $UA_2$ to which the call is targeted. To locate the $S\text{-}CSCF_2$ that serves $UA_2$, the $I\text{-}CSCF_2$ may need to use two network databases: (1) the $SLF_2$; and (2) the $HSS_2$. The $SLF_2$ is a database location function that finds the specific $HSS_2$ instance which holds the $UA_2$'s subscriber data (including which $S\text{-}CSCF_2$ is currently serving them), and is used when there are multiple HSSs instances in the terminating network 104. In this example, the I-CSCF$_2$ uses the Request URI in the SIP request as a public user identity to send a query (e.g., Dx-Location-Query PUI=sip: +123@op.com;user=phone) to the SLF$_2$ (step 5). Then, the SLF$_2$ sends a response (e.g., Dx-Location-Query_Rsp Server-Name=HSS$_2$) which indicates the HSS$_2$ back to the I-CSCF$_2$ (step 6). In the event there is a unique HSS in the network, then the SLF$_2$ and steps 5-6 may be omitted.

7-8. The I-CSCF$_2$ uses the Request URI in the SIP request as a public user identity to send a query (e.g., Cx- Location-Query PUI=sip:+123@op.com;user=phone) to the HSS$_2$ (step 7). Then, the HSS$_2$ sends a response (e.g., Cx-Location-Query_Rsp Server-Name=S-CSCF$_2$) which indicates the S-CSCF$_2$ back to the I-CSCF$_2$ (step 8).

9-10. Once the I-CSCF$_2$ has located the S-CSCF$_2$ it routes the call (e.g., INVITE sip:+123@op.com;user=phone) to that S-CSCF$_2$ (step 9). The terminating S-CSCF$_2$ then uses its internal location table to route the INVITE request to the contact address registered by the target user UA$_2$ (in the example above this contact address is B-UE@op.com) (step 10). If there is no contact address registered, but the target user UA$_2$ has activated some service which has an unregistered state, then the S-CSCF$_2$ forwards the SIP request to the AS indicated by the service information stored within the S-CSCF$_2$.

Referring to FIG. 2 (PRIOR ART), there is a signal flow diagram which is used to help describe a second routing process, namely the routing process that takes place when a call does not come from a peer S-CSCF$_1$ in a remote network. 102 as discussed above but instead when it comes from a MGCF$_1$. This particular second routing process occurs when a user UE$_3$ is located in a PSTN 202 and initiates a call with a tel URI towards the UA$_2$ which is located in the IMS terminating network 104. The steps for this particular routing process are as follows (reference is made to 3GPP TS 24.229 for more details):

1a. The MGCF$_1$ has a PSTN signaling interface that receives an IAM sent from UE$_3$ (step 1a). The MGCF$_1$ uses the IAM to obtain the target user's E.164 number and generate an INVITE SIP request that includes a Request-URI field which has either a tel URI (containing the E.164 number) or a SIP URI (with embedded E.164 number).

2a. In this particular example, the INVITE SIP request includes a tel URI (e.g., tel:+123) (compare this step 2a to step 4 in FIG. 1). The MGCF$_1$ forwards the INVITE SIP request (e.g., INVITE tel:+123) to the I-CSCF$_2$ which is located in the terminating network 104 (step 2a).

3a-8a. The steps 3a-8 a are similar to steps 5-10 from the previous routing procedure shown in FIG. 1 except that a tel URI (e.g., tel:+123) is used in some of the signals rather than the SIP URI (e.g., sip:+123@op.com;user=phone).

Unfortunately, the routing procedures described above presents some problems:

1. In the first routing process, the target telephone number used to initiate the call is lost before the INVITE SIP request arrives at the terminating network 104. In particular, the target telephone number is removed from the Request-URI within the SIP request by the originating S-CSCF$_1$ when it replaces the originally-dialed tel URI with the SIP URI/embedded tel URI which was obtained from the ENUM$_1$ (see steps 2-3). This is not very desirable because it. may be necessary for the terminating network 104 to provide this telephone number to certain services (e.g., MMS).

2. In both routing processes, to internally route a call within the terminating network 104, the user profile within the HSS$_2$ and the user-server association within the SLF$_2$ must include both the tel URI and the SIP form of that tel URI (SIP URI/embedded tel URI). This is needed because there are instances in the routing procedure where the SIR request received at the terminating network 104 can contain either a SIP URI/embedded tel URI (see FIG. 1) or a tel URI (see FIG. 2). Since, it is not known a-priori which format is actually being used by a given originating network 102, to be able to internally route the call within the terminating network 104 the user-server association within the SLF$_2$ and the user profile within the HSS$_2$ needs to include both the tel URI and the SIP form of that tel URI (the SIP URI/embedded tel URI). Thus, the SLF$_2$ and HSS$_2$ each need to maintain duplicate information for both the tel URI and the SIP URI/embedded tel URI which not only increases the administrative burden but also wastes memory space. This is not desirable.

Accordingly, there has been and is a need to address these shortcomings and other shortcomings associated with the prior art. These needs and other needs are satisfied by the present invention.

SUMMARY

The present invention proposes a specific handling of tel URIs in an IMS terminating network so as to enable routing of calls using telephone numbers (and not SIP URIs with embedded telephone numbers) as identifiers of the target users of those calls. Specifically, the present invention introduces a conversion module which is located within the IMS terminating network and is capable of converting SIP URIs with embedded telephone numbers into equivalent tel URIs which are then used by a terminating I-CSCF and S-CSCF to query the SLF and/or HSS so that they can to route the calls to the target users.

In one scenario, the conversion module can convert a SIP URI/embedded with a telephone number into an equivalent tel URI by: (1) extracting a target user part from the SIP URI/embedded with the telephone number; and (2) pre-pending the target user part with a string "tel:" to generate the equivalent tel URI. In another scenario, the conversion module can convert a SIP URI/embedded with a telephone number into an equivalent tel URI by: (1) extracting a first set of digits, namely a phone context descriptor (the phone context descriptor can be either a domain name or a global number prefix), located after the "phone-context" argument in the SIP URI/embedded with the telephone number; (2) extracting a second set of digits located after a "sip:" argument in the SIP URI/embedded with the telephone number and before the "phone-context" argument; and (3) pre-pending a string "tel:" before the first set of digits after which the second set of digits are inserted to generate the equivalent tel URI. In yet another scenario, the conversion module can convert a SIP URI/embedded, with a telephone number into an equivalent tel URI by: (1) extracting a first set of digits, namely a phone context descriptor, located after the "phone-context" argument; (2) extracting a second set of digits which are located after the "sip:" but before the "phone-context" argument; (3) using the first set of digits (phone context descriptor/global network prefix) as key to a pre-configured table of substitution rules to find a set of substitution rules; (4) applying these substitution rules to the second set of digits to produce a third set of digits, and (5) pre-pending a string "tel:" before the third set of digits to generate the equivalent tel URI.

Moreover, the present invention includes an I-CSCF that has receiver for receiving a SIP Request and a processor for determining if the SIP Request has a request URI that includes a SIP URI/embedded telephone number. In one scenario, the processor determines that the SIP request has a SIP URI/embedded telephone number if there is a "user=phone"

argument in the request URI. If the SIP request, has a SIP URI/embedded telephone number, then the I-CSCF has a query device that forwards the request URI towards a conversion module (which generates a corresponding tel URI from the SIP UPI/embedded, telephone number) and then receives the corresponding tel URI from the conversion module. Thereafter, the processor removes the SIP URI/embedded telephone number and inserts the received, tel URI in the request URI of the SIP request to form a revised SIP request. Lastly, the I-CSCF has a sender that submits the revised SIP request including the request URI with the corresponding tel URI towards a S-CSCF.

In addition, the present invention includes an S-CSCF that has receiver for receiving a SIP Request and a processor for determining if the SIP Request has a request URI that includes a SIP URI/embedded telephone number. In one scenario, the processor determines that the SIP request has a SIP URI/embedded telephone number if there is a "user=phone" argument in the request URI. If the SIP request has a SIP URI/embedded telephone number, then the S-CSCF has a query device that forwards the request URI towards a conversion module (which generates a corresponding tel URI from the SIR URI/embedded telephone number) and then receives the corresponding tel URI from the conversion module. Thereafter, the processor removes the SIP URI/embedded telephone number and inserts the received tel URI in the request URI of the SIP request to form a revised SIP request. Lastly, the S-CSCF has a sender that submits the revised SIP request including the request URI with the corresponding tel URI towards a terminating network.

An advantage of the present, invention is that since the I-CSCF and S-CSCF can route calls using the equivalent tel URIs then the SLF and/or HSS only need to maintain tel URIs of the target users and not maintain both the tel URIs and the SIP URI/embedded tel URIs of the target users. Another advantage of the present invention is that the conversion module can obtain the originally dialed telephone numbers of the target users which might have been stripped-off from the SIP request by a S-CSCF in the originating network and this is desirable since the terminating network may need the originating telephone numbers to support telephone number based services or legacy services like e.g. MMS.

BRIEF DESCRIPTION OF THE DRAWINGS

A more complete understanding of the present invention may be obtained by reference to the following detailed description when taken in conjunction with the accompanying drawings where in.

DETAILED DESCRIPTION

Figure 3:
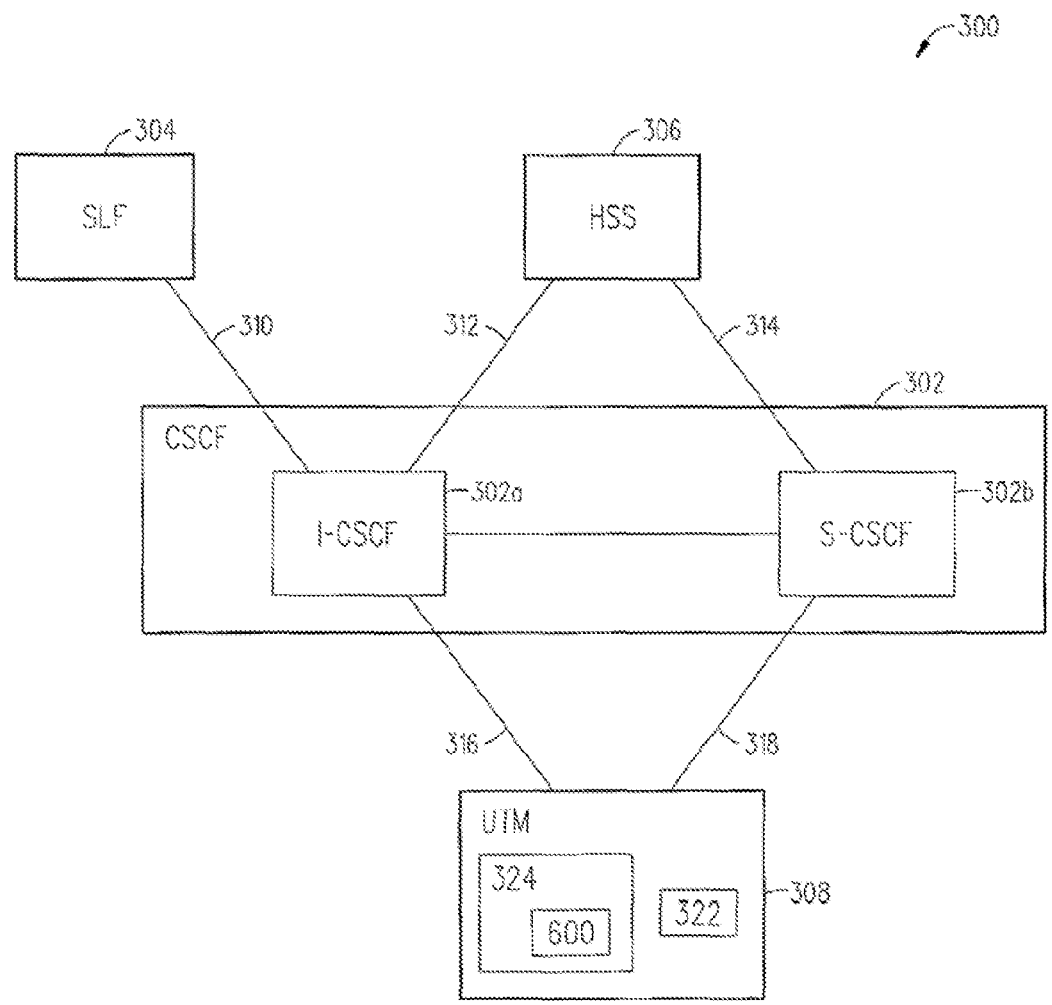
FIG. 3 is a block diagram of an IMS terminating network which has been enhanced with an UTM that functions to address the problems associated with the prior art in accordance with the present, invention.

Referring to FIG. 3, there is a block diagram of an exemplary IMS terminating network 300 which has a CSCF 302 (including an I-CSCF 302a and a S-CSCF 302b), a SLF 304, a HSS 306 and a UTM 308 that is used to help explain the present invention, As shown, the I-CSCF 302a respectively communicates with the SLF 304, if any, and the HSS 306 via links 310 and 312 while the S-CSCF 302b respectively communicates with the HSS 306 via link 314. Plus, the I-CSCF 302a and S-CSCF 302b respectively communicates with the UTM 308 on links 316 and 318 by using for example a query-response protocol that operates on top of TCP/IP. Alternatively, the UTM 308 could foe integrated with the CSCF 302 or, more particularly, with the I-CSCF 302a or with the S-CSCF 302b, in which case the communication links between them could be internal links which would not be visible from outside the CSCF 302. Or, the UTM 308 could be integrated with the SLF 304 and the HSS 306, in which case it would be possible to merge the CSCF-UTM interface with the CSCF-HSS interface 312, 314 (Cx) and CSCF-SLF interface 310 (Dx). It should be appreciated that the description provided herein does not discuss other details associated with the CSCF 302, the SLF 304 and the HSS 306 which are well known to those skilled in the industry and are not necessary to understand the present, invention.

Figure 4:
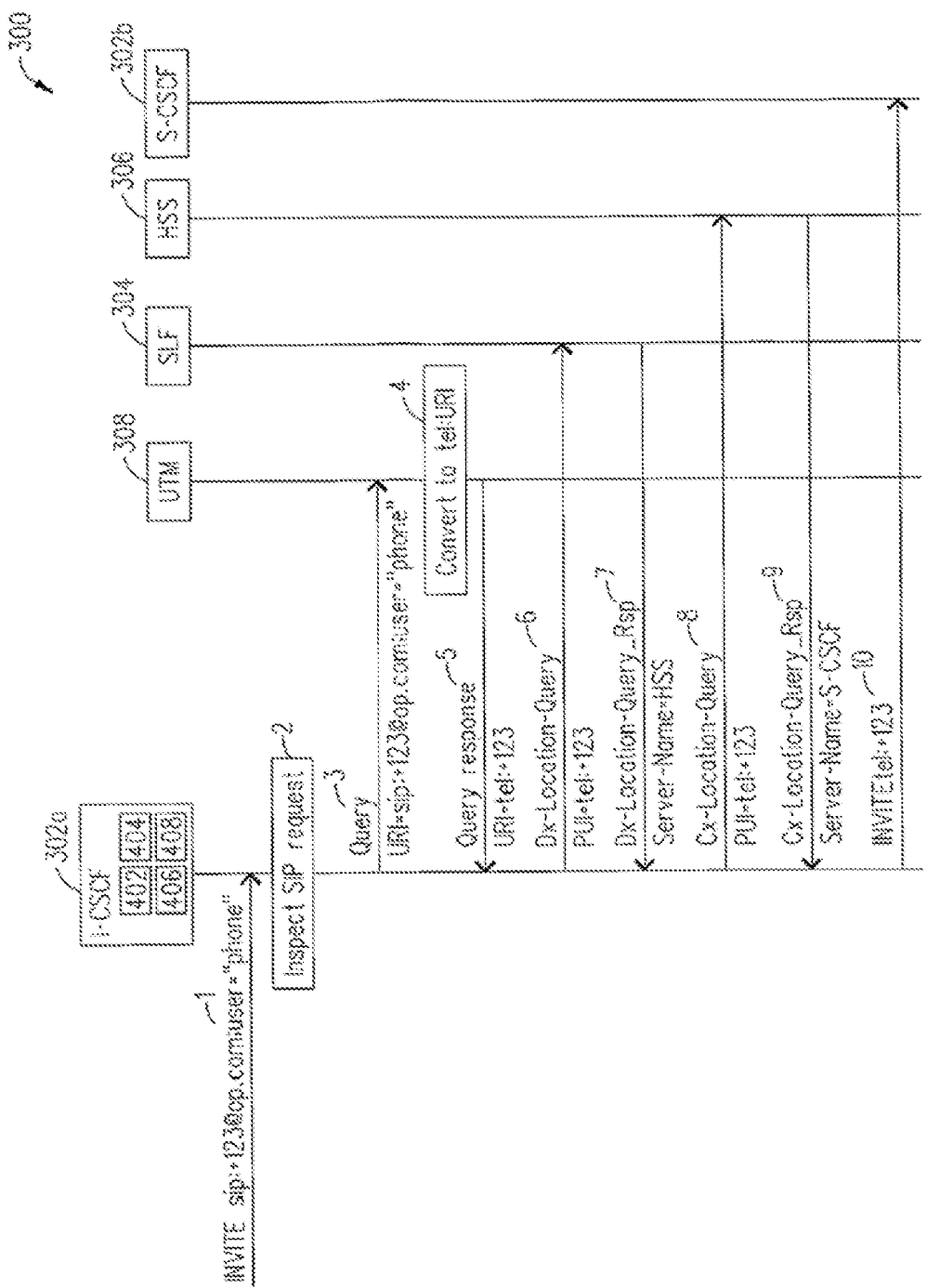
FIG. 4 is an exemplary signal flow diagram used to help explain how a call, which is received by an I-CSCF (located within the IMS terminating network), can be routed to a S-CSCF (located within the IMS terminating network) in accordance with a first embodiment of the present invention.

Referring to FIG. 4, there is an exemplary signal flow diagram which is used to help explain how when a call is received by the I-CSCF 302a (incorporating at least a receiver 402, a processor 404, a query device 406 and a sender 408) it can then be routed to the S-CSCF 302b in accordance with the present invention. Basically, when the I-CSCF 302a and in particular the receiver 402 receives a SIP request it has the processor 404 inspect the SIP request (but it does not inspect a REGISTER SIP request since tel URIs are not currently registered) to see if it's Request URI includes the SIP URI form of a tel URI (see steps 1-2). To do this, the I-CSCF 302a and in particular the processor 404 searches for a URI argument "user=phone" in the Request URI and, if it finds it, then the I-CSCF 302a and in particular the query device 406 sends the complete Request URI in a query to the UTM 308 (see step 3). The UTM 308 functions to: (a) receive the query; (b) take the SIP (URI/embedded, telephone number; (c) generate an equivalent tel URI; and (d) send a query response containing the equivalent tel URI back to the I-CSCF 302a (see steps 4-5 and FIG. 6).

Thereafter, the I-CSCF 302a and in particular the sender 403 uses the tel UPI received from the UTM 308 as a Public-Id when querying the SLF 304, if any, and the HSS 306 (see steps 6-9). Additionally, the I-CSCF 302a and in particular the processor 404 replaces the SIP UPI/embedded, tel URI in the original SIP request with the tel URI received from the UTM 308 so the sender 408 can send the revised SIP request to the S-CSCF 302b (see step 10). Since, I-CSCF 302a replaces the SIP URI/embedded tel URI in the original SIP request with the tel URI received from the UTM 308 this means that the routing of the revised SIP request inside the IMS target network 300 can be based on the tel URI from then on. As a result, the SLF 304 and the HSS 306 only need to store public IDs associated with tel URI and not store public IDs for both the tel URI and the SIP form of that tel URI. This is a marked improvement over the traditional routing process in which the $SLF_2$ and $HSS_2$ had to store information about both the tel URI and the SIP URI/embedded tel URI.

Figure 5:
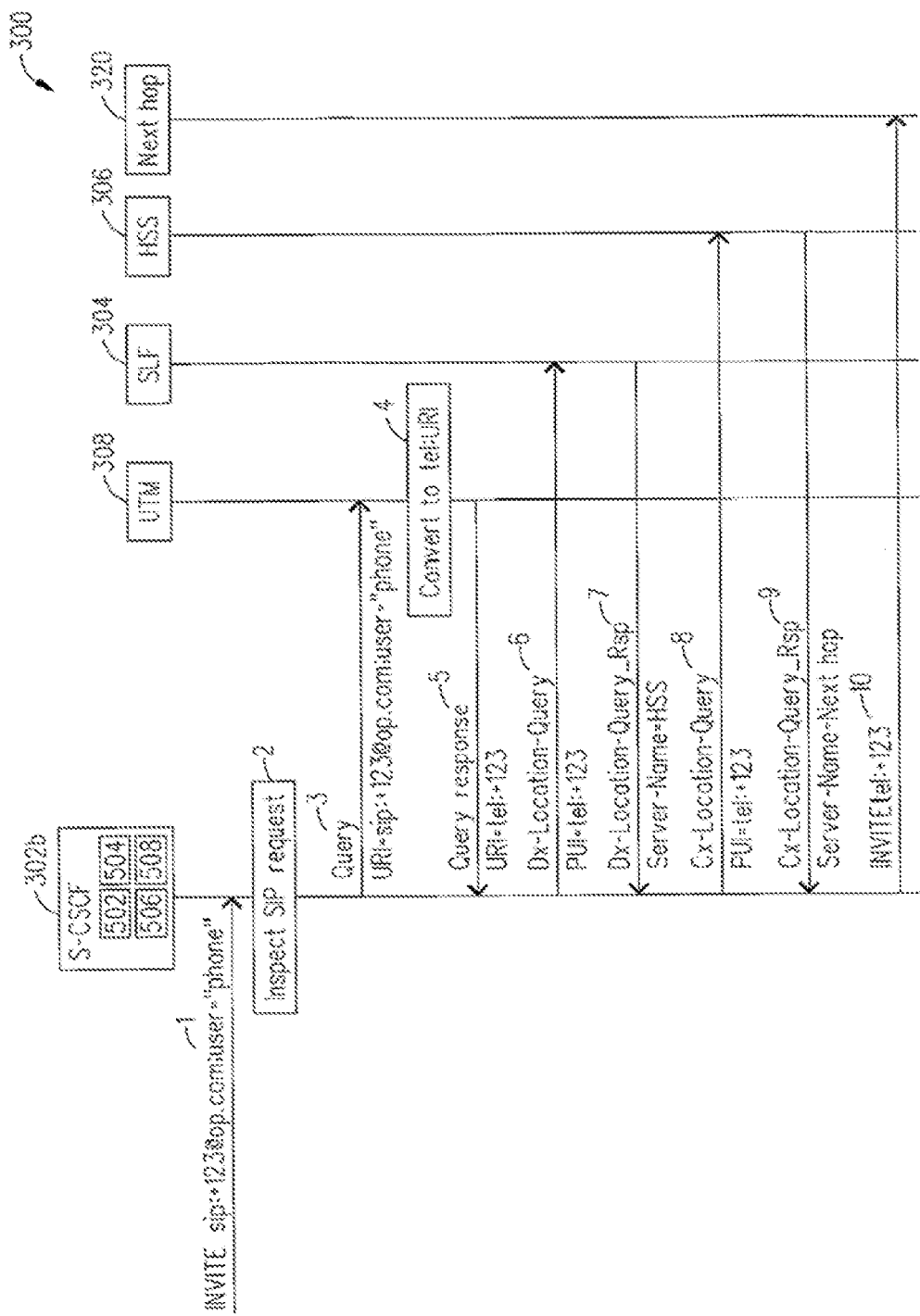
FIG. 5 is an exemplary signal flow diagram used to help explain how a call, which is received by an S-CSCF (located within an IMS transit network), can be routed to a next hop (located within the IMS terminating network) in accordance with a second embodiment of the present invention.

Referring to FIG. 5, there is an exemplary signal flow diagram which is used to help explain how when a call is received by a S-CSCF 302b (incorporating at least a receiver 502, a processor 504, a query device 506 and a sender 508) in a transit-network, the call can then be routed to a next hop 320 in accordance with the present invention. Basically, when the S-CSCF 302b and in particular the receiver 502 receives a SIP request it has the processor 504 inspect the SIP request (but it does not inspect a REGISTER SIP request since tel URIs are not currently registered) to see if it's Request URI includes the SIP URI form of a tel URI (see steps 1-2), To do this, the S-CSCF 302b and in particular the processor 504 searches for a URI argument "user=phone" in the Request URI and, if it finds it, then the S-CSCF 302b and in particular the query device 506 sends the complete Request URI in s query to the UTM 308 (see step 3). The UTM 308 functions to: (a) receive the query; (b) take the SIP URI/embedded telephone number; (c) generate an equivalent tel URI; and (d) send a query response containing the equivalent tel URI back to the S-CSCF 302b (see steps 4-5 and FIG. 6).

Thereafter, the S-CSCF 302b and in particular the sender 508 uses the tel URI received, from the UTM 308 as a Public-Id when querying the SLF 304 and the RSS 306 (see steps 6-9). Additionally, the S-CSCF 302b and in particular the processor 504 replaces the SIP URI/embedded tel URI in the SIP request with, the tel URI received from the UTM 300 so the sender 508 can send the revised SIP request to the next hop 320 (see step 10). Since, S-CSCF 302b replaces the SIP URI/embedded tel URI in the original SIP request with the tel URI received from the UTM 308 this means that the routing of the revised SIR request inside the IMS target network 300 can be based on the tel URI from then on. As a result, the SLF 304 and the HSS 306 only need to store public IDs associated with tel URI and not store public IDs for both the tel URI and the SIP form of that tel URI. This is a marked improvement over the traditional, routing process in which the $SLF_2$ and $HSS_2$ had to store information about both the tel URI and the SIP URI/embedded tel URI.

In any of the two embodiments above, it might happen that the query response sent from the UTM 308 includes an error code or message (see discussion below). In that case, the I-CSCF 302a/S-CSCF 302b could answer the request by sending a 404 (not found) response including some descriptive text like e.g. "Wrong domain in tel URI" back to the originating caller. This gives the originating caller that initiated the SIP request the chance to re-send the SIP request using a SIP URI instead of a tel URI, in case they are able to do so (e.g. an originating caller using a POTS telephone would not be able to re-send the request using a SIP URI).

Figure 6:
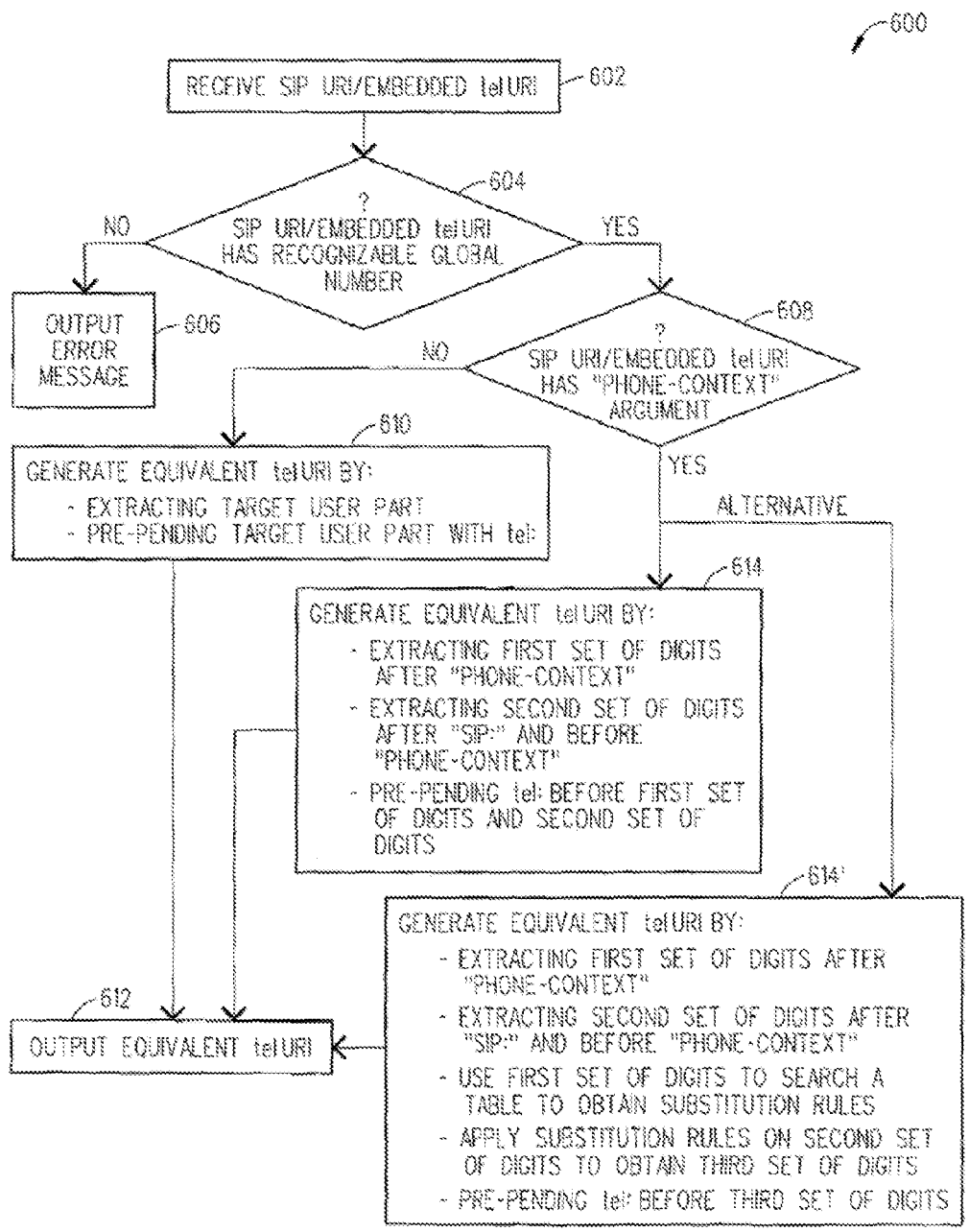
FIG. 6 is a flowchart illustrating the basic steps that the UTM performs to obtain an equivalent tel URI from a SIP URI which has an embedded telephone number in accordance with the present invention.

Referring to FIG. 6, there is a flowchart illustrating the basic steps of a method 600 that the UTM 308 performs so it can obtain an equivalent tel URI from a SIR URI which has an embedded telephone number in accordance with the present invention. Basically, the UTM 308 includes a processor 322 and a memory 324 which has instructions stored therein that are accessible and processable by the processor 322 to take a SIP URI/embedded telephone number and generate an equivalent tel URI.

Beginning at step 602, the UTM 308 receives a request URI containing a SIP URI/embedded a tel URI (see step 3 in FIGS. 4-5). At step 604, the UTM 308 determines if the SIP URI/embedded tel URI has a recognisable global number. If no, then the UTM 308 at step 606 outputs an error message (e.g., 404 (not found) response). For example, the UTM 308 would determine that the SIP URI/embedded tel URI does not represent a recognizable global number if it includes a "phone-context" argument with a non-recognizable local network prefix or a non-recognizable private prefix like e.g. "tel:2997; phone-context:=91339". In addition, the UTM 308 may determine that the SIP URI/embedded tel URI does not represent a recognizable global number if it includes a "phone-context" argument with a domain name that the UTM 308 does not recognise like e.g. "tel:2997;phone-context=unknown.domain.net". Generally, the UTM 308 would implement some sort of operator-dependent policy that would enable it to recognize or not recognize certain domain or domains. For instance, the UTM 308 may be able to recognize only the operator-allocated domain name(s).

If the answer to step 604 is yes, then the UTM 308 at step 608 determines if the SIP URI/embedded tel URI contains a "phone-context" argument. If no, then the UTM 308 at step 610 generates the equivalent tel URI by extracting a target user part from the SIP URI/embedded tel URI and then pre-pending the target user part with a string "tel:" to generate the equivalent tel URI. For instance, the UTM 308 can extract the target user part (e.g., +1-234-567-89) of the SIP URI (e.g., sip:+1-234-567-89@cingular.com;user=phone) and then pre-pend the extracted target user part (e.g., +1-234-567-89) with the string "tel:" to form the equivalent tel URI (e.g., tel:+1-234-567-89). At step 612, the UTM 308 stores the equivalent tel URI in memory 324 and then outputs the equivalent tel URI (see step 5 in FIGS. 4-5).

If the answer to step 608 is yes, then the UTM 308 at step 614 generates the equivalent tel URI by extracting a first set of digits located after the "phone-context" argument, extracting a second set of digits which are located after the "sip:" but before the "phone-context" argument and. then pre-pending a string "tel:" before the first set of digits after which the second, set of digits are inserted to generate the equivalent tel URI. For instance, if the received SIP URI /embedded tell URI (e.g. "tel:2997;phone-context=+3491339") includes the "phone-context" argument with a global network prefix or a domain name that the UTM 308 recognizes, an equivalent tel URI (e.g., tel:+34913392997) is built by inserting the first set of digits associated with the global network prefix (e.g., 3491339) between "tel:" prefix and the second set of digits (e.g., 2997) which followed the original string "tel:". Plus, the UTM 308 would remove any non-digit characters including the "phone-context" argument and "service-provider" argument (if present). At step 612, the UTM 308 stores the equivalent tel URI in memory 324 and then outputs the equivalent tel URI (see step 5 in FIGS. 4-5).

In an alternative embodiment when the answer to step 608 is yes, the UTM 308 at step 614' generates the equivalent tel URI by extracting a first set of digits, namely a phone context, descriptor, located after the "phone-context" argument, extracting a second set of digits which are located, after the "sip:" but before the "phone-context" argument, using the first set of digits (phone context descriptor/global network prefix) as key to a pre-configured. table of substitution rules to find a set of substitution rules, applying these substitution rules to the second set of digits to produce a third set of digits, and finally pre-pending a string "tel:" before the third, set of digits to generate the equivalent tel URI. For instance, if the received SIP URI/embedded tel URI (e.g. "tel:2997;phone-context=+3491339") includes the "phone-context" argument with a global network prefix that the UTM 308 recognizes, an equivalent tel URI (e.g., tel:+34913392997) is built by using the first set of digits associated with the global network prefix (e.g., 3491339) as a key to pre-configured table of substitution rules to find a set of substitution rules valid for the global network prefix, applying these substitution rules on the second set of digits (e.g., 2997) to produce a third set of digits (e.g., +34913392997), and finally pre-pending a string "tel:" before the third set of digits to obtain the equivalent tel URI (e.g., tel:+34913392997). At step 612, the UTM 308 stores the equivalent tel URI in memory 324 and then outputs the equivalent tel URI (see step 5 in FIGS. 4-5).

Figure 1:
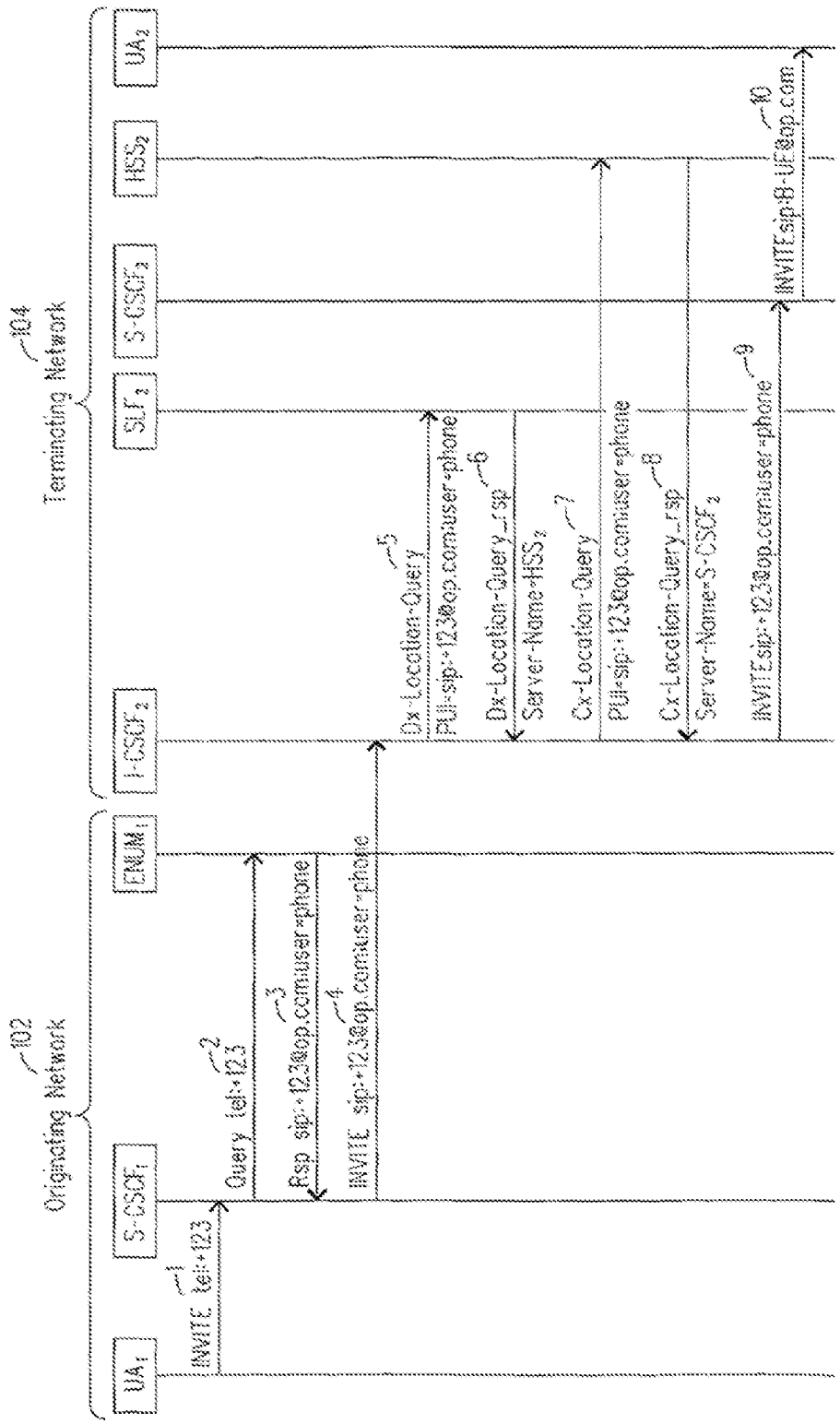
FIG. 1 (PRIOR ART) is a signal flow diagram used to help describe the problems associated with the traditional process of routing a call from a UA which is located within an IMS originating network to a UA which is located within an IMS terminating network.
Figure 2:
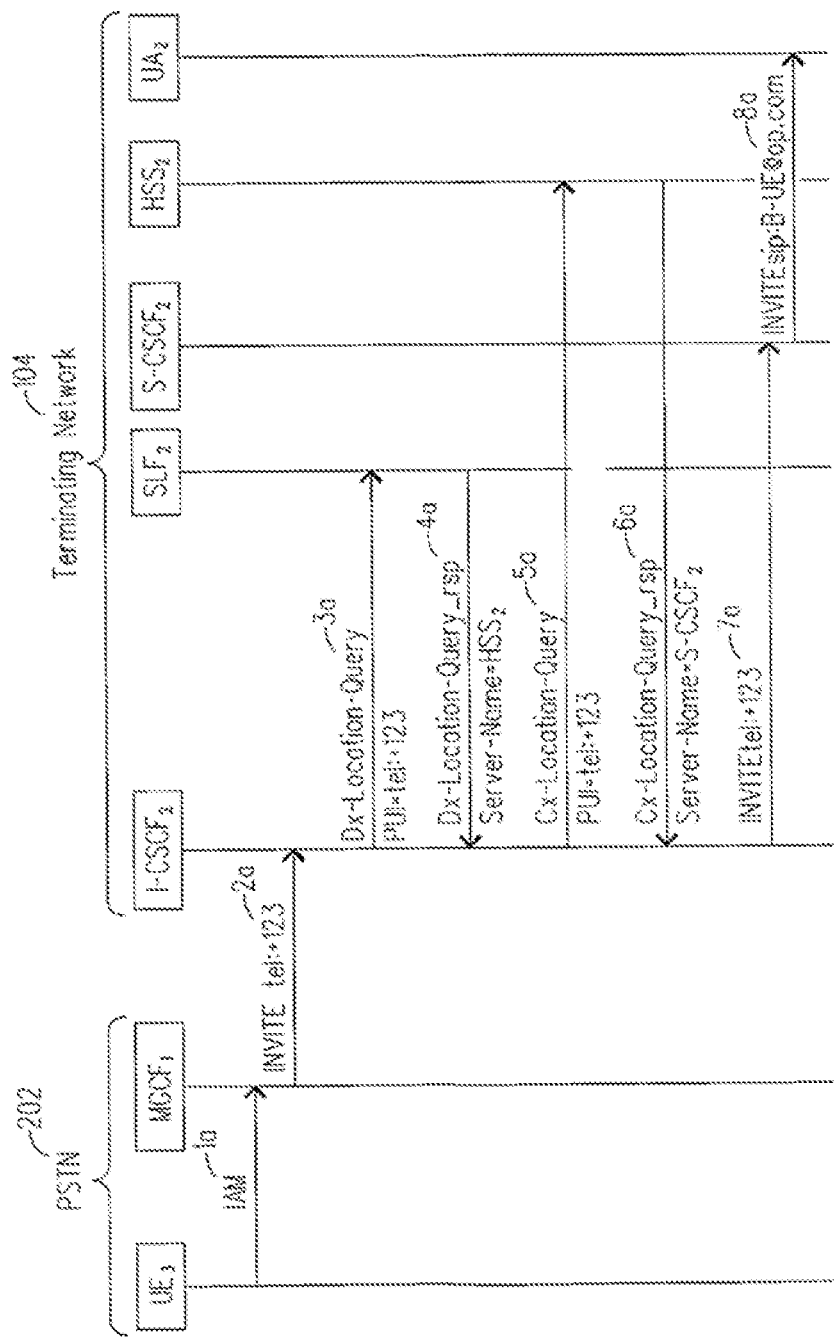
FIG. 2 (PRIOR ART) is a signal flow diagram used to help describe the problems associated with the traditional process for routing a call from a UE which is located in a PSTN to a UA which is located in an IMS terminating network.
Figure 7:
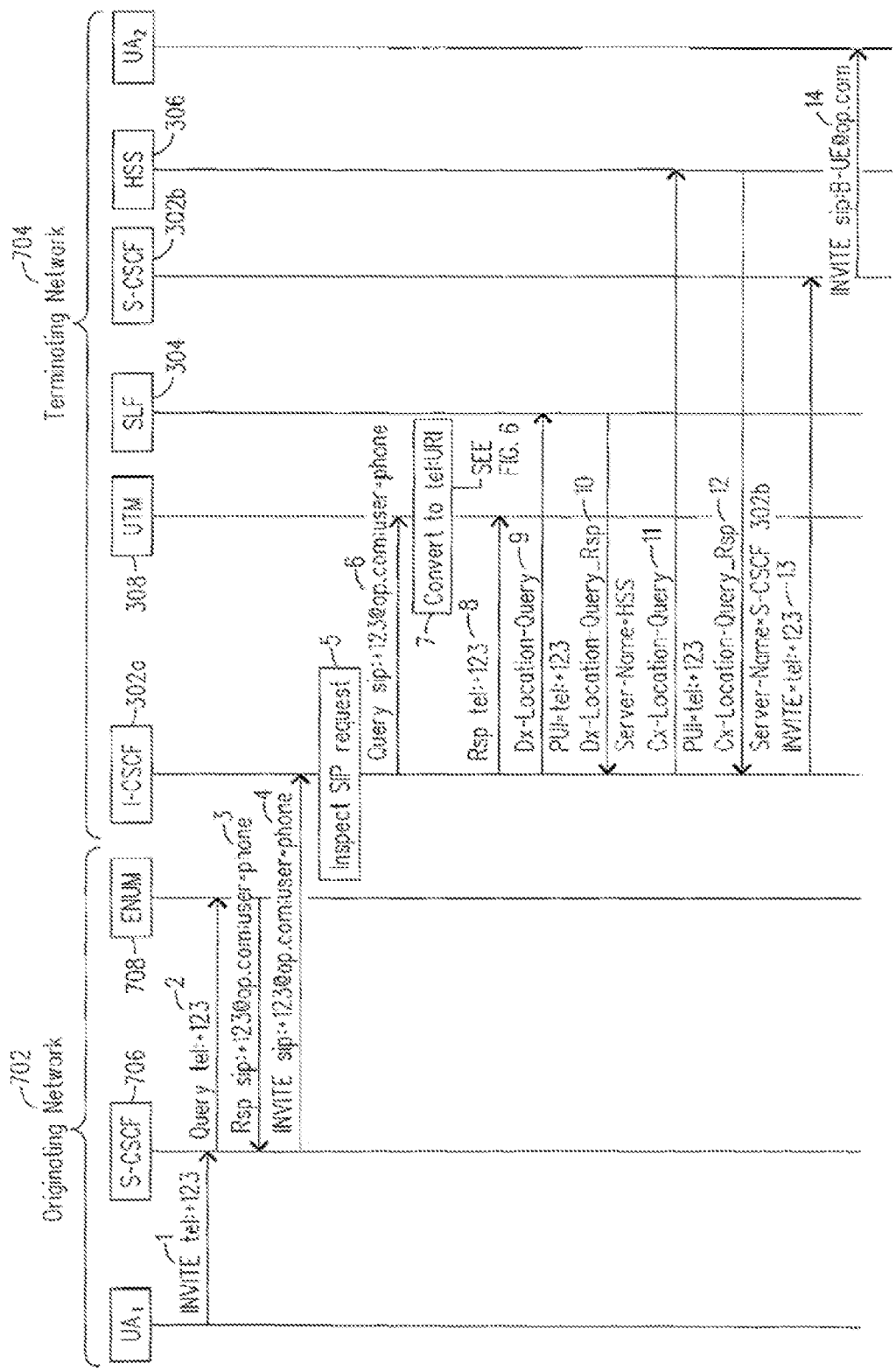
FIG. 7 is a signal flow diagram used to help describe the process of routing a call from a $UA_1$ which is located within an IMS originating network to a $UA_2$ which is located within an IMS terminating network in accordance with one embodiment of the present invention.

Referring to FIG. 7, there is a signal flow diagram used to help describe the inter-operator process of routing a call from a UA$_1$ located within an. originating network 702 to a UA$_2$ located within a terminating/destination network 704 in accordance with the present invention (compare to FIG. 1). The steps are as follows:

1-3. The originating S-CSCF 706 receives a SIP request (e.g., INVITE tel: +123) from UA$_1$ (step 1). The S-CSCF 706 takes a Request-URI from the received session-initiating INVITE request and if the Request-URI contains a tel URI then S-CSCF 706 queries an ENUM 708 service (step 2). The ENUM 708 changes the tel URI into a SIP URI/embedded tel URI (e.g., sip: +123@op.com;user=phone) and sends it to the S-CSCF 706 (step 3). The S-CSCF 706 would also replace the original tel URI in the SIP request with the SIP URI/embedded tel URI obtained from the query to form a new SIP request (e.g., INVITE sip: +123@op.com;user=phone).

4. The originating S-CSCF 706 takes the domain part (e.g., op.com) of the new Request-URI and forwards the new INVITE SIR request to the address identified by that domain (if the domain is an IPv4 or IPv6 address the INVITE can be forwarded to that address straight away, otherwise a DNS needs to be queried using the domain part to obtain a destination IP address, which corresponds to either an IBCF or an I-CSCF 302a in the terminating network 704). In this example, the S-CSCF 706 forwards the new SIP request (e.g., INVITE sip: +123@op.com; user=phone) directly to the I-CSCF 302a (step 4).

5-8. The I-CSCF 302a receives and inspects the SIP request (e.g., INVITE sip: +123@op.com;user=phone) to see if it includes the SIP URI form of a tel URI in the Request URI (step 5). To do this, the I-CSCF 302a searches for a URI argument "user=phone" in the Request URI and, if it finds it, then the I-CSCF 302a sends the complete Request URI in a query (e.g., Query sip:+123@op.com;user=phone) to the UTM 308 (step 6). The UTM 308 receives the query and uses the SIP URI/embedded telephone number to generate an equivalent tel URI (e.g., tel:+123) by implementing method 600 (step 7). Then, the UTM 308 sends a query response (e.g., Rsp tel:+123) back to the I-CSCF 302a (step 8).

9-10. The I-CSCF 302a uses the tel URI received from the UTM 308 as a Public-Id to send a query (e.g., Dx-Location-Query PUI=tel:+123) to the SLF 304 (see step 9), if more than one HSS exists in the terminating network. Then, the SLF 304 sends a response (e.g., Dx-Location-Query_Rsp Server-Name=HSS 306) indicating HSS 306 back to the I-CSCF 302a (step 10). If just one HSS exists, then the SLF 304 and steps 9-10 may be omitted.

11-12. The I-CSCF 302a uses the tel URI received from the UTM 308 as a Public-Id to send a query (e.g., Cx- Location-Query PUI=tel: +123) to the HSS 306 (step 11). Then, the HSS 306 sends a response (e.g., Cx-Location-Query_Rsp Server-Name=S-CSCF 302b) indicating S-CSCF 302b back to the I-CSCF 302a (step 12).

Note: the I-CSCF 302a performs steps 9-12 to locate the S-CSCF 302b serving the user UA$_2$ to which the call is targeted.

13-14. Once the I-CSCF 302a has located the S-CSCF 302b it routes the call (e.g., INVITE sip: +123) to S-CSCF 302b (step 13). The terminating S-CSCF 302b then uses its internal location table to route the INVITE request to the contact address registered by the target user UA$_2$ (in the example above this contact address is B-UE@op.com.) (step 14). If there is no contact, address registered, but the target user UA$_2$ has activated some service which has an unregistered state, then the S-CSCF 302b forwards the SIP request to the AS indicated in the service information stored within the S-CSCF 302b.

From the foregoing, it should be appreciated, by those skilled in the art that the present invention proposes a specific handling of tel URIs in the IMS terminating network 300 and 704 so as to enable routing of calls using the telephone numbers (and not the SIP UPI with embedded telephone numbers) as identifiers of the target users of those calls. Specifically, the present invention introduces a conversion module 303 which is located in the IMS terminating network 300 and 704 and is capable of converting SIP URIs with embedded telephone numbers into equivalent tel URIs which are then used by the IMS terminating I-CSCF and S-CSCF to query the SLF and/or HSS so that they can route the calls to the target users. Basically, the present, invention enhances the call routing process in an IMS terminating network in the following ways (for example):

The UTM 308 enables the usage of telephone numbers with a Carrier-ENUM service in an inter-operator routing process without the implied problems associated with managing two types of Public User Identities in the HSS and SLF.

The UTM 308 allows implementation-independent forwarding of the originally dialed telephone number and its characteristics to the IMS terminating network which could be necessary for supporting telephone number based services or legacy services like e.g. MMS.

The UTM 308 allows network operators to deploy a Carrier-ENUM service so that there would be no necessity to provision SLFs and HSSs with more than one full URI per user. This leads to an associated economy in administration and management of the service because only the tel URI of a user needs to be provisioned while in the past both the tel URI and the SIP version of that same URI needed to be provisioned.

The UTM 308 allows the interfacing with various MGCFs which use different ways of encoding the originating user's E.164 number without the need to update the HSS or SLF databases with duplicate public identities of the targeted user.

Although several embodiments of the present invention have been illustrated in the accompanying Drawings and described in the foregoing Detailed Description, it should be understood that the invention is not limited to the disclosed embodiments, but instead is also capable of numerous rearrangements, modifications and substitutions without departing from the spirit of the invention as set forth and defined by the following claims.

What is claimed is:

1. An Interrogating Call Session Control Function entity configured to route a Session Initiation Protocol (SIP) request in a terminating network towards a Serving Call Session Control Function entity, comprising:
   a receiver configured to receive the SIP request;
   a processor configured to determine that the SIP request has a request Uniform Resource Identifier (URI) which includes a SIP URI with an embedded telephone number;
   a conversion module configured to generate a telephone number (tel URI) when said SIP URI contains a "phone-context" argument as follows:
      extract a first set of digits located after the "phone-context" argument;
      extract a second set of digits located after a "sip:" in the SIP URI and before the "phone-context" argument;
      derive a third set of digits from the first set of digits and the second set of digits; and
      pre-pend a string "tel:" before the third set of digits to generate the tel URI;
   said processor configured to remove the SIP URI with the embedded telephone number and insert the tel URI in the request URI of the SIP request to form a revised SIP request; and
   a sender configured to submit the revised SIP request including the request URI with the tel URI towards the Serving Call Session Control Function.

2. The Interrogating Call Session Control Function entity of claim 1, wherein the conversion module is configured to derive the third set of digits by pre-pending the first set of digits before the second set of digits to produce the third set of digits.

3. The Interrogating Call Session Control Function entity of claim 1, wherein the conversion module is configured to derive the third set of digits by:
   using the first set of digits as a key to a pre-configured table of substitution rules to find a set of substitution rules; and,
   applying the set of substitution rules to the second set of digits to produce the third set of digits.

4. The Interrogating Call Session Control Function entity of claim 1, wherein said processor is configured to determine that the SIP request has the SIP URI with the embedded telephone number when there is a "user=phone" argument in the request URI.

5. The Interrogating Call Session Control Function entity of claim 1, wherein upon receiving the corresponding tel URI from the conversion module the processor is configured to replace the SIP URI with the embedded telephone number by the corresponding tel URI in the SIP request to form the revised SIP request, and route the revised SIP request.

6. A Serving Call Session Control Function entity configured to route a Session Initiation Protocol (SIP) request through a transit network towards a terminating network, the Serving Call Session Control Function entity comprising:
   a receiver configured to receive the SIP request;
   a processor configured to determine that the SIP request has a request Uniform Resource Identifier (URI) which includes a SIP URI with an embedded telephone number;
   a conversion module configured to generate a telephone number (tel URI) when said SIP URI contains a "phone-context" argument as follows:
      extract a first set of digits located after the "phone-context" argument;
      extract a second set of digits located after a "sip:" in the SIP URI and before the "phone-context" argument;
      derive a third set of digits from the first set of digits and the second set of digits; and,
      pre-pend a string "tel:" before the third set of digits to generate the tel URI;
   said processor configured to remove the SIP URI with the embedded telephone number and insert the tel URI in the request URI of the SIP request to form a revised SIP request; and
   a sender configured to submit the revised SIP request with the tel URI towards the terminating network.

7. The Serving Call Session Control Function entity of claim 6, wherein the conversion module is configured to derive the third set of digits by pre-pending the first set of digits before the second set of digits to produce the third set of digits.

8. The Serving Call Session Control Function entity of claim 6, wherein the conversion module is configured to derive the third set of digits by:
   using the first set of digits as a key to a pre-configured table of substitution rules to find a set of substitution rules; and
   applying the set of substitution rules to the second set of digits to produce the third set of digits.

9. The Serving Call Session Control Function entity of claim 6, wherein said processor is configured to determine that the SIP request has the SIP URI with the embedded telephone number when there is a "user=phone" argument in the request URI.

10. The Serving Call Session Control Function entity of claim 6, wherein upon receiving the corresponding tel URI from the conversion module the processor is configured to replace the SIP URI with the embedded telephone number by the corresponding tel URI in the SIP request to form the revised SIP request, and route the revised SIP request.

11. A method in an Interrogating Call Session Control Function (I-CSCF) entity for routing a Session Initiation Protocol (SIP) request in a terminating network towards a Serving Call Session Control Function entity (S-CSCF), the method comprising:
   receiving the SIP request at the I-CSCF entity;
   determining, by the I-CSCF entity, that the SIP request has a request Uniform Resource Identifier (URI) which includes a SIP URI with an embedded telephone number;
   generating, by the I-CSCF entity, a telephone number (tel URI) when said SIP URI contains a "phone-context" argument by:
      extracting a first set of digits located after the "phone-context" argument;
      extracting a second set of digits located after a "sip:" in the SIP URI and before the "phone-context" argument;
      deriving a third set of digits from the first set of digits and the second set of digits; and
      pre-pending a string "tel:" before the third set of digits to generate the tel URI;
   removing, by the I-CSCF entity, the SIP URI with the embedded telephone number; and,
   inserting, by the I-CSCF entity, the tel URI in the request URI of the SIP request to form a revised SIP request; and
   submitting, from the I-CSCF entity, the revised SIP request including the request URI with the tel URI towards the S-CSCF.

12. The method of claim 11, wherein the deriving the third set of digits further comprises:
pre-pending the first set of digits before the second set of digits to produce the third set of digits.

13. The method of claim 11, wherein the deriving the third set of digits further comprises:
using the first set of digits as a key to a pre-configured table of substitution rules to find a set of substitution rules; and,
applying the set of substitution rules to the second set of digits to produce the third set of digits.

14. The method of claim 11, wherein the I-CSCF entity comprises a conversion module that performs the generating step.

15. A method in a Serving Call Session Control Function entity (S-CSCF) for routing a Session Initiation Protocol (SIP) request towards a terminating network, the method comprising:
receiving the SIP request at the S-CSCF;
determining, by the S-CSCF entity, that the SIP request has a request Uniform Resource Identifier (URI) which includes a SIP URI with an embedded telephone number;
generating, by the S-CSCF entity, a telephone number (tel URI) when said SIP URI contains a "phone-context" argument by:
extracting a first set of digits located after the "phone-context" argument;
extracting a second set of digits located after a "sip:" in the SIP URI and before the "phone-context" argument;
deriving a third set of digits from the first set of digits and the second set of digits; and
pre-pending a string "tel:" before the third set of digits to generate the tel URI;
removing, by the S-CSCF entity, the SIP URI with the embedded telephone number;
inserting, by the S-CSCF entity, the tel URI in the request URI of the SIP request to form a revised SIP request; and,
submitting, from the S-CSCF entity, the revised SIP request including the request URI with the tel URI towards the terminating network.

16. The method of claim 15, wherein the deriving the third set of digits further comprises:
pre-pending the first set of digits before the second set of digits to produce the third set of digits.

17. The method of claim 15, wherein the deriving the third set of digits further comprises:
using the first set of digits as a key to a pre-configured table of substitution rules to find a set of substitution rules; and,
applying the set of substitution rules to the second set of digits to produce the third set of digits.

18. The method of claim 15, wherein the S-CSCF entity comprises a conversion module that performs the generating step.

* * * * *